United States Patent
Vanhee

(10) Patent No.: US 6,741,437 B2
(45) Date of Patent: May 25, 2004

(54) SAFETY DEVICE FOR ELECTRICAL STORAGE CELL BATTERY AND BATTERY EQUIPPED WITH THE DEVICE

(75) Inventor: Jean-Luc Vanhee, St Benoit (FR)

(73) Assignee: Alcatel, Paris (FR)

( * ) Notice: Subject to any disclaimer, the term of this patent is extended or adjusted under 35 U.S.C. 154(b) by 598 days.

(21) Appl. No.: 09/739,386

(22) Filed: Dec. 19, 2000

(65) Prior Publication Data

US 2001/0006747 A1 Jul. 5, 2001

(30) Foreign Application Priority Data

Dec. 23, 1999 (FR) .............................. 99 16330

(51) Int. Cl.⁷ .................................. H02H 9/00
(52) U.S. Cl. ...................... 361/57; 320/122; 429/61
(58) Field of Search .................... 361/57, 91.1; 307/41, 307/50, 130; 320/106, 116, 118, 119, 120, 121, 122, 135, 136; 324/430, 431, 434; 429/7, 9, 50, 61, 90

(56) References Cited

U.S. PATENT DOCUMENTS 4,713,597 A * 12/1987 Altmejd ...................... 320/122
5,180,641 A * 1/1993 Burns et al. .................... 429/1
5,206,775 A * 4/1993 Wilson .......................... 361/15
5,258,244 A 11/1993 Hall et al. ...................... 429/61
5,880,575 A * 3/1999 Itou et al. ..................... 320/122
5,898,239 A * 4/1999 Kawam ........................ 307/130
6,087,035 A * 7/2000 Rogers et al. ................. 429/61

FOREIGN PATENT DOCUMENTS

EP            0 515 024 A2     11/1992 .......... H01H/37/32

* cited by examiner

*Primary Examiner*—Ronald W. Leja
(74) *Attorney, Agent, or Firm*—Sughrue Mion, PLLC

(57) ABSTRACT

A safety device for a battery of electrical storage cells composed of modules connected in series each including a storage cell or a group of storage cells connected in parallel. A circuit individually short circuits a module if it should fail and maintains the electrical continuity between the other modules connected in series with it. An individual circuit includes a first shunt circuit connected to the terminals of a module and includes an energy consuming member in series with a switching member for applying a shunt to the terminals of the module via the consuming member if the voltage at the terminals of the module is greater than a particular upper voltage threshold value. The circuit short circuits the module if the voltage at the terminals of the module falls below a particular lower voltage threshold value.

18 Claims, 2 Drawing Sheets

SAFETY DEVICE FOR ELECTRICAL STORAGE CELL BATTERY AND BATTERY EQUIPPED WITH THE DEVICE

BACKGROUND OF THE INVENTION

1. Field of the Invention

The invention relates to a safety device for electrical storage cell batteries which is more particularly intended to maintain the reliability of the battery in the event of failure of one of the cells, especially in the case of a high-capacity battery made up of series-connected groups of parallel-connected cells.

2. Description of the Prior Art

The conditions under which electrical storage cell batteries are used often require the current and/or the voltage supplied by a battery to a load to be maintained by the battery even if one of its cells becomes unusable, and without the battery being open-circuit at any time. This is the case in particular if it is not possible to repair the battery. It can be achieved in particular when the battery is designed to that end and consists of series-connected groups of parallel-connected cells, for example, as indicated above.

The failed cell has then to be taken out of circuit and this can be achieved in particular by isolating the failed cell from the series connection without at any time rendering the battery open-circuit. This can be achieved by a total shunt applied by means of a conductive device connected in parallel with the failed cell, or where applicable the failed group of cells, to shunt virtually all of the current flowing through the failed cell or failed group of cells.

Shunt devices constructed to this end from diodes or functionally equivalent electronic devices and which shunt the current of a failed cell or a failed group of cells when it leaves a specified range of operating voltage are known in the art. They have the drawback of dissipating a great deal of heat, in particular if they are associated with lithium-ion cells, for which the operating voltage range is from 2.5 V to 4.2 V, and in the case of high-capacity cells using other technologies, especially nickel-hydrogen and nickel-cadmium cells, if the discharge currents are high, for example greater than 80 A.

"Non-dissipative" devices used for nickel-hydrogen batteries in particular are also known in the art. They generally have the drawback of applying an external short circuit to the failed cell when they are activated, which is not acceptable in the case of failure of a charged cell. Such failures can be encountered with lithium-ion cells in particular. This is known in the art. To alleviate this drawback, some batteries are equipped with make-before-break devices which first close a circuit in parallel with a failed cell in order to shunt the current flowing in it before breaking the series-connected circuit. These devices isolate the failed cell from the other cells connected in series with it in the battery in a sufficiently short time, routinely of the order of a few milliseconds, for the external short circuit caused in this way not to cause any damage. These devices are complex, however, as they are similar to pyrotechnic devices, and they have the major drawback of including an additional fuse or circuit-breaker component in the series-connected cells or groups of cells of the battery. The component in question therefore reduces the reliability of the system that the battery constitutes.

There is therefore a requirement for a shunt safety device which does not dissipate heat and is suitable for batteries consisting of high-voltage cells, in particular lithium-ion cells, and/or for batteries with a high output current. A shunt safety device is required that can operate with a charged cell without risk of applying an external short circuit to the cell. Furthermore, the device must not include any additional circuit-breaker component that could reduce the reliability of the series-connected circuit of the battery.

The invention therefore proposes a safety device aimed at remedying the above drawbacks, for different electrical storage cell battery configurations, in particular for batteries including a plurality of individual cells connected in series and for batteries consisting of series-connected groups of parallel-connected cells.

SUMMARY OF THE INVENTION

The invention provides a safety device for a battery of electrical storage cells composed of modules connected in series each including a storage cell or a group of storage cells and in particular a group of storage cells connected in parallel, the device including at least one individual circuit for individually short circuiting a module if it should fail and maintaining permanently the electrical continuity between the other modules connected in series with it in the battery, wherein the individual circuit includes a first shunt circuit that is connected to the two end terminals of a module in the battery and includes an electrical energy consuming member in series with a switching member for applying a shunt to the terminals of the module via the consuming member if the voltage at the terminals of the module is greater than a particular upper voltage threshold value, the circuit directly short circuiting the terminals of the module if the voltage at the terminals of the module falls below a particular lower voltage threshold value.

In one embodiment of the device according to the invention, said circuit short circuits internally the module to whose terminals it is connected via a first shunt circuit by extending the discharging of said module via said first shunt circuit so that immediately discharging of the battery recommences the battery is discharged until a reversal of polarity occurs which corresponds to a negative threshold of the voltage at the terminals of the module and causing it to be short circuited.

In another embodiment of the device according to the invention a module circuit includes a second shunt circuit connected to the two end terminals of the module in the battery in parallel with the first shunt circuit associated with the module and includes a switching member for short circuiting the terminals of the module directly if the voltage at the terminals of the module is below a particular lower voltage threshold value.

The invention also provides electrical storage cell batteries made up of series-connected modules each including one cell or a group of cells and in particular a group of cells connected in parallel which use a safety device having the above features.

The invention, its features and its advantages are explained in the following description with reference to the accompanying drawings.

DETAILED DESCRIPTION OF THE PREFERRED EMBODIMENTS

Figure 1:
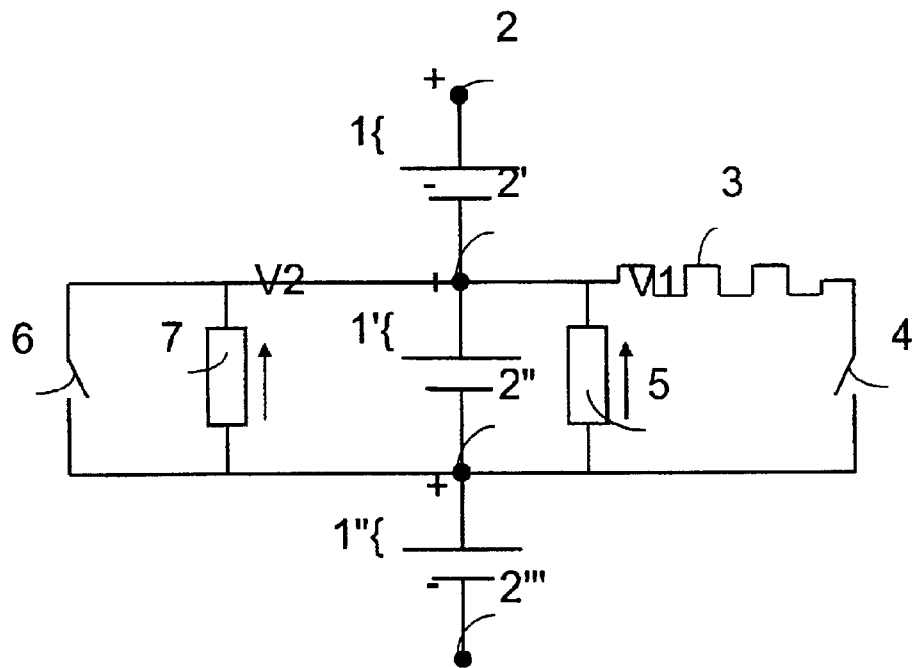
FIG. 1 is a circuit diagram of one of the individual circuits of a safety device according to the invention, one of which individual circuits is provided for each module of a battery consisting of a plurality of modules connected in series and each consisting of an electrical storage cell or a group of electrical storage cells.

The individual safety device circuit shown diagrammatically in FIG. 1 is intended to be associated with a module of an electric storage cell battery. An electric storage cell battery is often composed of modules, which are usually identical, connected in series and represented by three modules 1, 1' and 1" in FIG. 1. As already indicated, each module can consist of an electrical storage cell or a group of electrical storage cells, for example a group of "p" identical storage cells connected in parallel.

Each module is equipped with an individual safety device circuit, as shown diagrammatically in FIG. 1 for the module 1'. The circuit includes two shunt circuits which are connected in parallel to the two end terminals of a module of the battery, i.e. to the terminals 2' and 2" in the case of the module 1'.

A first of the two shunt circuits includes an electrical energy consuming member, such as an energy dissipating resistor 3, for example, in series with a switching member 4, for example a bistable switching member. The first circuit is designed to be turned on by the switching member 4 to short circuit the terminals 2' and 2" of the module 1' via the consuming member 3, under all conditions and more particularly if the storage cell or cells of the module 1 are charged and possibly fully charged. The consuming member 3 is therefore chosen to suit the capacity of the module, to enable the module to be discharged slowly, with a level of heat dissipation compatible with the battery environment and typically corresponding to a current equivalent to one tenth or one hundredth of the capacity of the module 1'. Thus in the event of failure of the module 1' the storage cell or group of storage cells of that module is discharged relative to the other storage cells of the series-connected combination constituting the battery, as if its leakage current were increased by the current flowing through the consuming member 3. The switching member 4 is turned on, directly or indirectly, by a trigger device 5, for example on detecting that the voltage at the terminals of the module 1' has crossed an upper voltage threshold value V1. As specified below, the switching member and the trigger device can be combined so that the first shunt circuit operates autonomously. They can also be separate and the switching member can be controlled by an external programmed control unit.

The second of the two shunt circuits of the safety device according to the invention includes a switching member 6, for example a one-shot switching member whose change of state is irreversible, for directly short circuiting the terminals 2' and 2" of the module 1 when it is switched to a conducting state from a state in which it is not conducting. The conducting state of the switching member 6 is triggered by a trigger device 7, for example on detecting that the voltage at the terminals of the module 1' has crossed a lower voltage threshold value V2, to create a short circuit between those terminals that is intended to be permanent. It is of course feasible to combine the trigger devices 5 and 7.

The invention activates the first and second shunt circuits successively to reduce the voltage at the terminals of the module 1' progressively. It activates the first shunt circuit during a first phase if the voltage at the terminals has exceeded the particular upper threshold value V1, above which the module 1' must be considered to have failed. It then activates the second shunt circuit during a second phase if the first circuit has caused the voltage at the terminals of the module 1' to fall below the value V2 to provide a direct and permanent short circuit between the terminals. The lower voltage threshold value V2 is determined in a conventional manner to authorize safe short circuiting, and is of the order of 2.5 V in the case of a lithium-ion storage cell, for example.

In accordance with the invention, a failed module is instead short circuited internally by continuing to discharge the module via the first shunt circuit associated with it until electrical continuity between terminals of a module from the time the voltage at the terminals of the module has exceeded the upper voltage threshold value V1. Discharging is then continued via the first shunt circuit until a reversal of the polarity which corresponds to a negative threshold of the voltage at the terminals of the module occurs immediately discharging of the battery recommences. The module then has a very low internal resistance, which short circuits it permanently.

Figure 2:
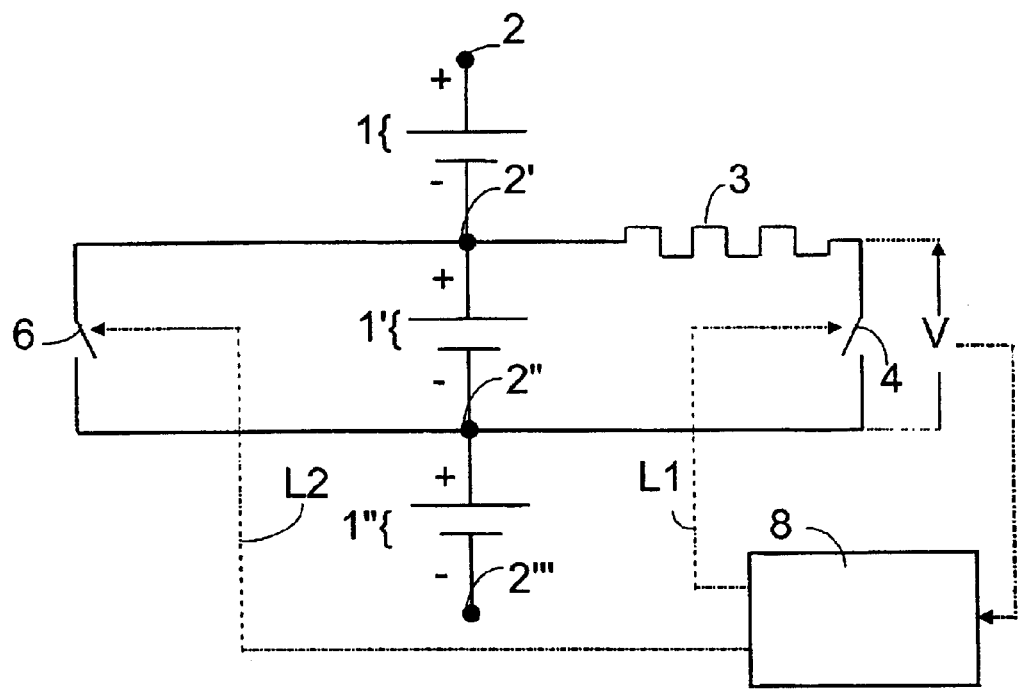
FIG. 2 is a circuit diagram of an individual circuit of a safety device according to the invention when the device is controlled by an external programmed control unit.

In one embodiment the switching member 4 can be a relay. The relay is calibrated to withstand the current that the module 1' can supply via the resistor 3 in the event of a serious failure for which the voltage at the terminals of the module exceeds the upper threshold value V1. The resistor 3 is also calibrated, of course, for the same reason. In the embodiment shown diagrammatically in FIG. 2, the relay that constitutes the switching member 4 is controlled by a programmed control unit 8 external to the safety device, as symbolized by the link L1. The programmed control unit 8 is a logic unit, for example, based on a processor and memories with at least one interface through which it receives a voltage value V measured at the terminals of the module 1'. In accordance with a particular program it successively commands the switching member 4 of the first shunt circuit and the switching member 6 of the second shunt circuit.

A control unit of the above kind, programmed accordingly, can use different switching member control programs. In particular, if the voltage V falls below V1 for a long time, it is possible to control the switching member 4 differently, to bring it to an interruption condition from a condition in which it is conducting and for which a current flows through the resistor 3, because of the presence at the terminals of the module 1' of a voltage V greater than V1.

Figure 3:
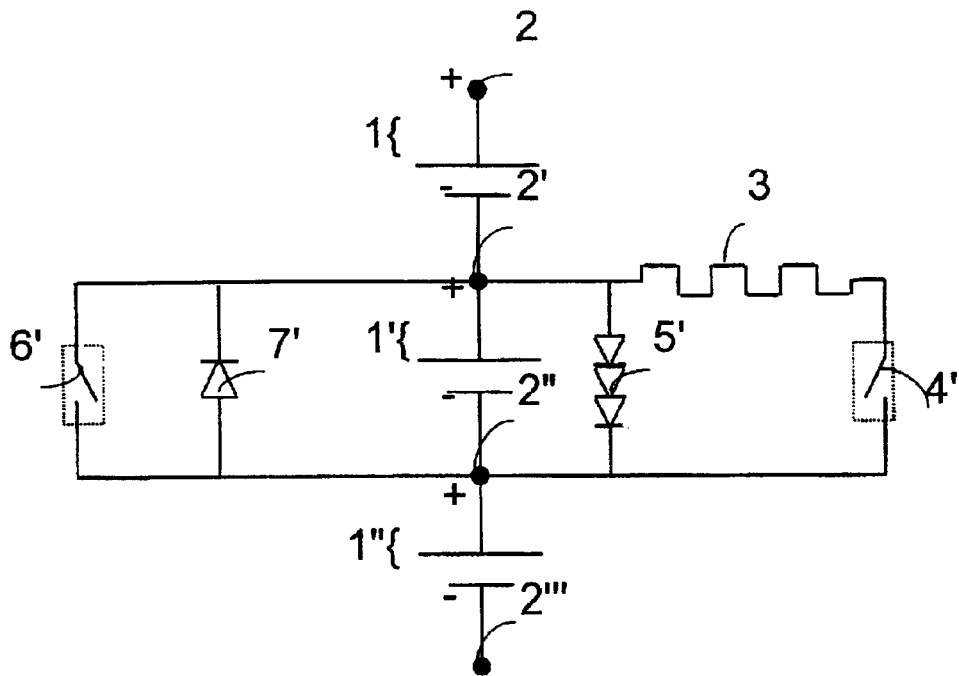
FIG. 3 is a circuit diagram of an individual circuit of a safety device according to the invention in a circuit when the device is controlled internally.
Figure 4:
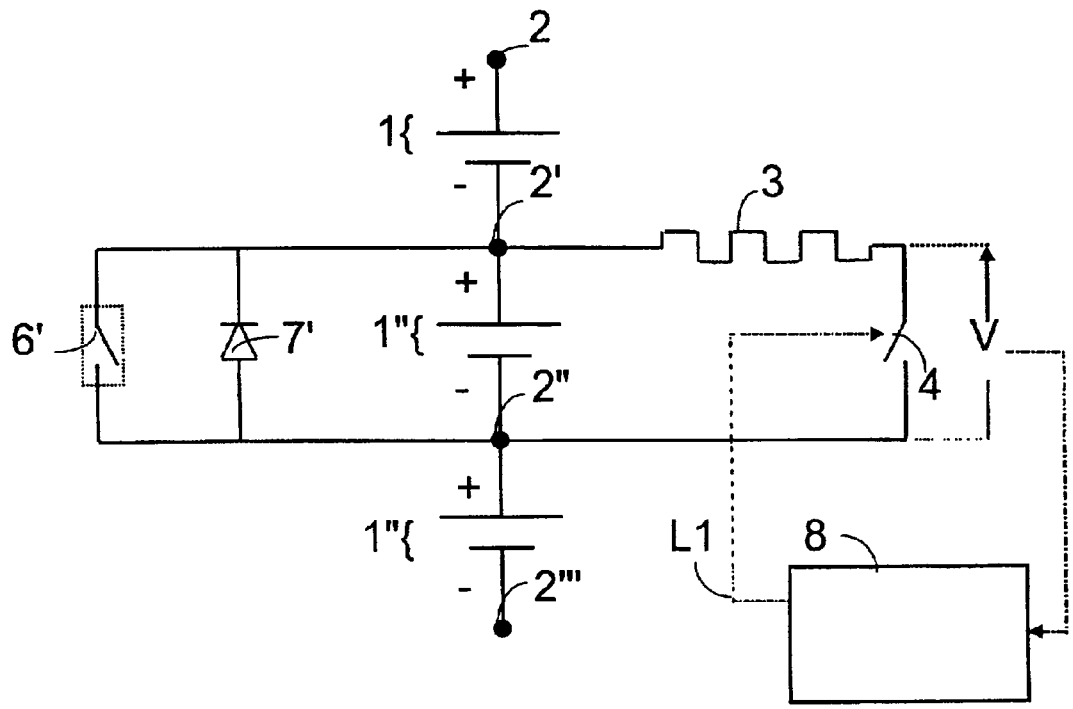
FIG. 4 is a circuit diagram of an individual circuit of a safety device according to the invention when the device is controlled by a hybrid control system.

In the embodiment shown in FIGS. 3 and 4, at least one of the switching members, now referenced 4', 6', of the safety device is a heat-sensitive member which changes from a non-conducting state to a conducting state when it is heated. In one embodiment the heat-sensitive members change irreversibly to a conducting state from a non-conducting state when they are heated to a temperature above a particular minimum threshold temperature.

FIG. 3 presupposes that the two switching members 4' and 6' each consist of a heat-sensitive member and that they are associated with heating element type trigger devices 5' and 7'.

The trigger device 5', which is connected to the terminals of the module 1', consists of a plurality of diodes connected in series and arranged to heat the heat-sensitive member which constitutes the switching member 4'. This trigger device operates if the voltage V between the terminal 2" and the terminal 2' is greater than the upper threshold value V1. The series-connected combination of the diodes, possibly associated with a series-connected resistor, not shown, causes sufficient heating to change the state of the switching member 4' under these conditions. The person skilled in the art knows how to achieve this.

The trigger device 7', which is also connected to the terminals of the module 1', consists in this example of a single diode connected in the reverse direction compared to the series-connected diodes of the trigger device 5', i.e. with its cathode connected to the terminal 2' and its anode connected to the terminal 2". The single diode heats the heat-sensitive member which constitutes the switching member 6' to cause it to change state if the voltage V between the terminals 2" and 2' falls below the lower threshold value V2. The resulting safety device can therefore operate entirely autonomously.

In FIG. 4 the safety device includes a first shunt circuit switching member 4 which is controlled by a control unit 8 external to the safety device, as in the embodiment shown in FIG. 2, and again as symbolized by a link L1. However, the second shunt circuit is equipped with a heat-sensitive switching member 6' controlled by a heating trigger device 7' consisting of a diode in a circuit corresponding to that envisaged for the second shunt circuit described with reference to FIG. 3. In this case, if the voltage V drops below V1 for a long time, it is therefore possible to change the switching member 4 to an interruption condition from a condition in which it is conducting and for which a current flows through the resistor 3, because of the presence at the terminals of the module 1' of a voltage V greater than V1. On the other hand, if the voltage V drops below the lower threshold value V2, the module is short circuited permanently.

Whichever solution is chosen, it is preferable to equip each of the series-connected modules of one or more electrical storage cells of a battery with a safety device enabling it to be short circuited individually in the event of failure, as envisaged hereinabove.

What is claimed is:

1. A safety device for a battery of electrical storage cells composed of a plurality of modules connected in series each including at least one storage cell, said device including:
   at least one individual circuit for individually short circuiting a module if said module should fail and maintaining permanently electrical continuity between the other of said modules connected in series with said module,
   wherein said at least one individual circuit includes:
   a first shunt circuit that is connected to two end terminals of said module, and wherein said first shunt circuit includes:
   an electrical energy consuming member in series with a switching member for applying a shunt to the terminals of said module via said consuming member if the voltage at the terminals of said module is greater than a particular upper voltage threshold value, said at least one individual circuit directly short circuiting the terminals of said module if the voltage at said terminals of said module falls below a particular lower voltage threshold value.

2. The device claimed in claim 1, wherein said at least one individual circuit short circuits internally the module to whose terminals it is connected via the first shunt circuit by extending the discharging of said module via said first shunt circuit until a reversal of polarity which corresponds to a negative threshold of the voltage at the terminals of the module occurs immediately discharging of the battery commences.

3. The device claimed in claim 1, wherein a second shunt circuit is connected to the two end terminals of the module of the battery in parallel with the first shunt circuit associated with said module and includes a switching member for short circuiting the terminals of the module directly if the voltage at the terminals of the module is below the particular lower voltage threshold value.

4. The device claimed in claim 3, wherein each individual circuit includes at least one trigger device which is responsive to the voltage present at said terminals of said module with which said each individual circuit is associated, for at least one of said first and second shunt circuits of said individual circuit, and which controls switching of said switching member of said individual circuit to a conducting state from one of the particular upper and lower voltage threshold values.

5. The device claimed in claim 3, wherein said switching member of said first shunt circuit is switched on if a voltage measured for said at least one individual circuit at said terminals of said module exceeds said particular upper voltage threshold value, and said switching member of said second shunt circuit of said individual circuit is turned on immediately if said measured voltage falls below said particular lower voltage threshold value.

6. The device claimed in claim 1, wherein one of said at least one individual circuits is provided for each module.

7. The device claimed in claim 1, wherein said electrical energy consuming member of said at least one individual circuit is an energy dissipating resistor.

8. The device claimed in claim 1, wherein said member of said first shunt circuit of said at least one individual circuit is controlled by an external programmed control unit in accordance with the voltage at said terminals of said module.

9. A battery of electrical storage cells made up of a plurality of modules connected in series and each including at least one storage cell, said battery including:
   a safety device including at least one individual circuit for individually short circuiting a module if said module should fail and maintaining permanently electrical continuity between the other of said modules connected in series with said module,
   wherein said at least one individual circuit includes:
   a first shunt circuit that is connected to two end terminals of said module, and wherein said first shunt circuit includes:
   an electrical energy consuming member in series with a switching member for applying a shunt to the terminals of said module via said consuming member if the voltage at the terminals of said module is greater than a particular upper voltage threshold value, said at least one individual circuit directly short circuiting the terminals of said module if the voltage at said terminals of said module falls below a particular lower voltage threshold value.

10. The device claimed in claim 9, wherein said at least one individual circuit short circuits internally the module to whose terminals it is connected via the first shunt circuit by extending the discharging of said module via said first shunt circuit until a reversal of polarity which corresponds to a negative threshold of the voltage at the terminals of the module occurs immediately discharging of the battery commences.

11. The device claimed in claim 9, wherein a second shunt circuit is connected to the two end terminals of the module of the battery in parallel with the first shunt circuit associated with said module and includes a switching member for short circuiting the terminals of the module directly if the voltage at the terminals of the module is below the particular lower voltage threshold value.

12. The device claimed in claim 11, wherein each individual circuit includes at least one trigger device which is responsive to the voltage present at said terminals of said module with which said each individual circuit is associated, for at least one of said first and second shunt circuits of said individual circuit, and which controls switching of said switching member of said individual circuit to a conducting state from one of the particular upper and lower voltage threshold values.

13. The device claimed in claim 9, wherein said switching member of said first shunt circuit is switched on if a voltage measured for said at least one individual circuit at said terminals of said module exceeds said particular upper voltage threshold value, and said switching member of said second shunt circuit of said individual circuit is turned on immediately if said measured voltage falls below said particular lower voltage threshold value.

14. The device claimed in claim 9, wherein one of said at least one individual circuits is provided for each module.

15. The device claimed in claim 9, wherein said electrical energy consuming member of said at least one individual circuit is an energy dissipating resistor.

16. The device claimed in claim 9, wherein said switching member of said first shunt circuit of said at least one individual circuit is controlled by an external programmed control unit in accordance with the voltage at said terminals of said module.

17. A safety device for a battery of electrical storage cells composed of a plurality of modules connected in series each including a plurality of storage cells connected in parallel, said device including:
    at least one individual circuit for individually short circuiting a module if said module should fail and maintaining permanently electrical continuity between the other of said modules connected in series with said module,
    wherein said at least one individual circuit includes:
        a first shunt circuit that is connected to two end terminals of said module, and wherein said first shunt circuit includes:
            an electrical energy consuming member in series with a switching member for applying a shunt to the terminals of said module via said consuming member if the voltage at the terminals of said module is greater than a particular upper voltage threshold value, said first shunt circuit directly short circuiting the terminals of said module if the voltage at said terminals of said module falls below a particular lower voltage threshold value.

18. A battery of electrical storage cells made up of a plurality of modules connected in series and each including a plurality of storage cells connected in parallel, said battery including:
    a safety device including at least one individual circuit for individually short circuiting a module if said module should fail and maintaining permanently electrical continuity between the other of said modules connected in series with said module,
    wherein said at least one individual circuit includes:
        a first shunt circuit that is connected to two end terminals of said module, and wherein said first shunt circuit includes:
            an electrical energy consuming member in series with a switching member for applying a shunt to the terminals of said module via said consuming member if the voltage at the terminals of said module is greater than a particular upper voltage threshold value, said first shunt circuit directly short circuiting the terminals of said module if the voltage at said terminals of said module falls below a particular lower voltage threshold value.

* * * * *